United States Patent [19]

Zatylny

[11] Patent Number: 4,687,402
[45] Date of Patent: Aug. 18, 1987

[54] CARRIER FOR CYLINDRICAL HAY BALES

[76] Inventor: Michael D. Zatylny, R.R. #1, Sundre, Alberta, Canada, T0M 1X0

[21] Appl. No.: 785,834

[22] Filed: Oct. 9, 1985

[51] Int. Cl.4 ............................................. A01D 87/12
[52] U.S. Cl. ..................................... 414/24.6; 74/522; 414/24.5; 414/547; 414/703
[58] Field of Search ..................... 414/24.5, 24.6, 546, 414/547, 911, 703; 74/522

[56] References Cited

U.S. PATENT DOCUMENTS

| | | | |
|---|---|---|---|
| 2,706,570 | 4/1955 | Jewell et al. | 414/621 |
| 4,090,624 | 5/1978 | Krein et al. | 414/24.6 |
| 4,298,301 | 11/1981 | Carter et al. | 414/24.6 |
| 4,363,583 | 12/1982 | Bontrager | 414/24.5 |
| 4,459,075 | 7/1984 | Eichenberger | 414/24.5 |
| 4,478,547 | 10/1984 | Den Boer | 414/24.5 |
| 4,505,166 | 3/1985 | Tesar | 74/522 X |
| 4,538,948 | 9/1985 | Melton | 414/24.6 |
| 4,594,041 | 6/1986 | Hostetler | 414/24.5 |

FOREIGN PATENT DOCUMENTS

| | | | |
|---|---|---|---|
| 772976 | 12/1967 | Canada | 214/43 |
| 1007198 | 3/1977 | Canada | 214/108 |
| 1062668 | 9/1979 | Canada | 214/87 |

Primary Examiner—Robert J. Spar
Assistant Examiner—Janice Krizek

[57] ABSTRACT

A carrier for cylindrical hay bales is adapted for mounting on the box of a pickup truck. It includes a shaft pivoted in a support frame about a horizontal axis and a pair of bale lifting arms are mounted to opposite ends of the pivoted shaft. These arms can swing laterally for engaging and disengaging hay bales by means of bale piercing spikes at the outer ends of the arms. A hydraulic system is provided for swinging the pivoted shaft and bale lifting arms from a rearward position adjacent the ground to a forward position adjacent the truck body. For this purpose, two hydraulic cylinders with a special crank arm linkage are used with one of the hydraulic cylinders being capable of swinging the bale lifting arms through an arc of up to about 130° C. and the second hydraulic cylinder being adapted to swing the bale lifting arms through an additional arc of up to about 70° C. Alternatively, a chain and sprocket system driven by a hydraulic cylinder may be used. This provides exceptional versatility in the handling of the bales.

5 Claims, 7 Drawing Figures

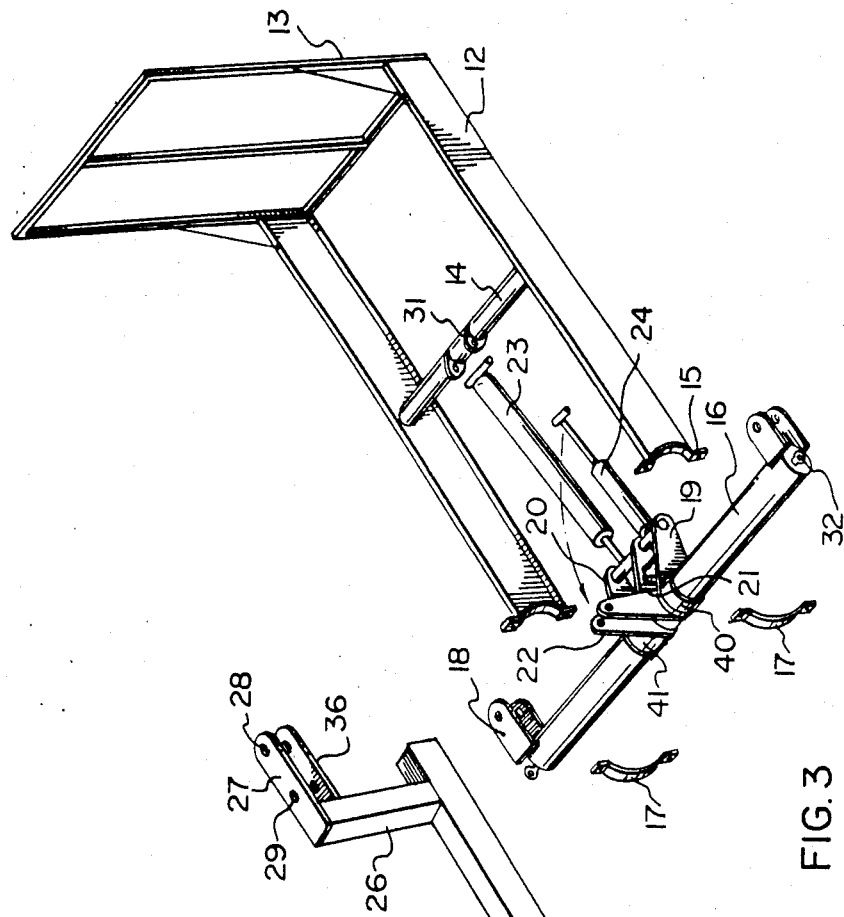

CARRIER FOR CYLINDRICAL HAY BALES

BACKGROUND OF THE INVENTION

This invention relates to an apparatus for handling cylindrical hay bales.

For many years hay has been baled in rectangular bales. In recent times, an apparatus has been developed for producing cylindrical bales of hay and these are quite large, having diameters of up to 5 feet. The baler leaves them lying on their cylindrical side in the field and special equipment must be used to handle these very large bales because they may weigh as much as 1500 pounds.

In feedlot operations, it is quite common to use one of these large bales by simply unrolling it along the ground for livestock to eat. Thus, any device developed for picking up the bales in the field and carrying them should also be adapted for use in delivering and/or unrolling the bales in a feedlot.

One such device of this type is decribed in Canadian Pat. No. 1,062,668 issued Sept. 18, 1979. That patent shows a device for mounting in the back of a truck and includes a pair of pivoting arms for picking up a bale of hay and swinging it into an upright position over the body of the truck. It is also adapted for use in unrolling a bale in a feedlot. However, it is quite limited in the manner in which it can be used and for instance, it is capable of transporting only a single bale of hay and it cannot be used for dropping a bale over the fence of a feedlot.

The present invention represents a substantial improvement over the design shown in the above patent and, in particular, has much greater versatility

SUMMARY OF THE INVENTION

The present invention in its broadest aspect includes a generally horizontal frame which may be mounted in a pickup truck or some other form of vehicle. A pivot shaft is mounted transversely in this frame about a horizontal axis. A pair of telescopic bale lifting arms are mounted by ends thereof to opposite ends of the pivot shaft and these arms are mounted to the shaft by pivot pins perpendicular to the axis of the shaft to permit lateral swinging of the arms about these pivot pins. The arms have at their outer ends bale piercing axle arrangements for engaging and rotatably holding a cylindrical hay bale between the outer ends of the arms. A hydraulic arrangement is provided for moving the arms toward and away from each other about the pivot pins for the purpose of engaging or disengaging a cylindrical hay bale.

A second hydraulic means is provided for rotating the pivot shaft through a total arc of at least 180° between a rearward position with the arms extending rearwardly and downwardly at an incline below the horizontal and a forward position with the arms extending forwardly and substantially horizontal.

DESCRIPTION OF THE PREFERRED EMBODIMENTS

According to a preferred embodiment, the hydraulic means for rotating the pivot arm includes a primary hydraulic cylinder mounted between a crank arm fixed to the pivot shaft and a second arm rotatably mounted on the pivot shaft for either pivoting or holding the fixed and rotatable arms with respect to each other. A secondary hydraulic cylinder is mounted between the above mentioned rotatably mounted arm on the pivot shaft and the frame for pivoting this rotatably mounted arm with respect to the frame. With this arrangement, with the primary cylinder in fixed position thereby fixing the rotatable arm with respect to the fixed arm, actuation of the secondary hydraulic cylinder causes movement of the bale lifting arms from a rearward position below the horizontal to a forward position beyond the vertical but substantially less than a forward horizontal position. Activation of the primary hydraulic cylinder causes further forward and downward movement of the bale lifting arms toward a forward horizontal position In a typical arrangement, the secondary hydraulic cylinder can swing the bale lifting arms through an arc of up to about 130°. The primary hydraulic cylinder can typically swing the bale lifting arms though an additional arc of up to about 70°. In other words, the total possible swing of the arms is preferably about 200° and at least 180°.

According to another embodiment, the swing of the arms through an arc of at least 180° is carried out by way of a chain and sprocket or cable and pulley system driven by a hydraulic cylinder.

The apparatus of this invention may conveniently be supported by a pickup truck, to the bed of which the frame is secured. The pivot shaft extends behind and transverse to the truck body.

DESCRIPTION OF THE APPARATUS

One preferred embodiment of this invention is illustrated by the attached drawings in which:

FIG. 3 is an exploded view of the main components of the apparatus;

FIG. 4 is an exploded view of a pivot arm assembly;

Figure 1:
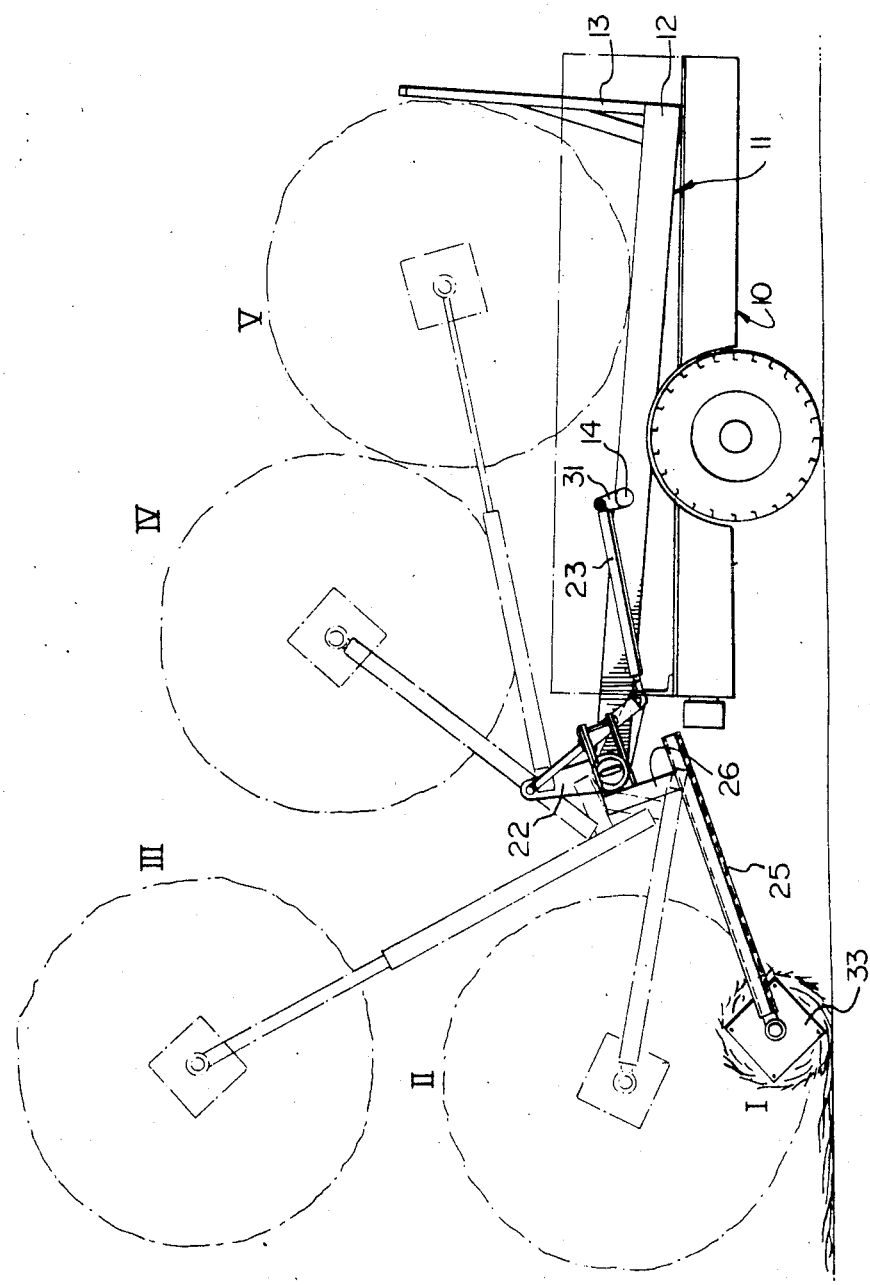
FIG. 1 is a side view of the invention installed in the box of a pickup truck, showing the apparatus in five different positions of use.

As seen from FIG. 1, the apparatus of this invention may conveniently be installed in the box of a pickup truck 10 and has a main frame structure 11 for this purpose. The frame includes side channel members 12, a front end frame assembly 13 and a central cross bar 14 fixed between the side channel members 12.

A main pivot shaft 16 in the form of a hollow, tubular steel cylindrical member is mounted at the rear end of channel members 12. The mounting consists of a split sleeve arrangement including semi-circular sleeve portions 15 connected to the ends of channel members 12 and outer semi-circular sleeve portions 17. The sleeve portions 15 and 17 are bolted together and hold the shaft 16 for free rotation. A pair of bracket plates 18 is welded to each end of shaft 16.

The rotation of shaft 16 is achieved by means of two hydraulic cylinders 23 and 24. One end of hydraulic cylinder 23 is mounted to brackets 31 fixed to cross bar 14 and the other end of hydraulic cylinder 23 is connected between a pair of pivot arms 20 and 21 which are mounted on a sleeve 41 which is free to rotate about shaft 16. The second hydraulic cylinder 24 is shorter than cylinder 23 and one end of this cylinder is connected between pivot arm 21 and a further pivot arm 19 which is mounted on a sleeve 40 which is free to rotate about shaft 16. The other end of hydraulic cylinder 24 is connected between a pair of projecting crank arms 22 which are non-rotatably fixed, e.g. welded, to shaft 16.

Further details of pivot arms 19, 20 and 21 are shown in FIG. 4 and it will be seen that they are mounted by split sleeve arrangements. Thus, there are two half sleeves 40 and 41 with the arms 19, 20 and 21 fixed thereto as shown and two additional half sleeves 40a and 41a are provided for mating with the sleeves 40 and 41, respectively, rotatably holding shaft 16 therebetween. For additional rigidity, a cross-brace 42 may be welded between arms 19 and 21 and a single pivot rod may be used through the three arms 19, 20 and 21 for holding the ends of the two hydraulic cylinders 23 and 24.

Figure 2:
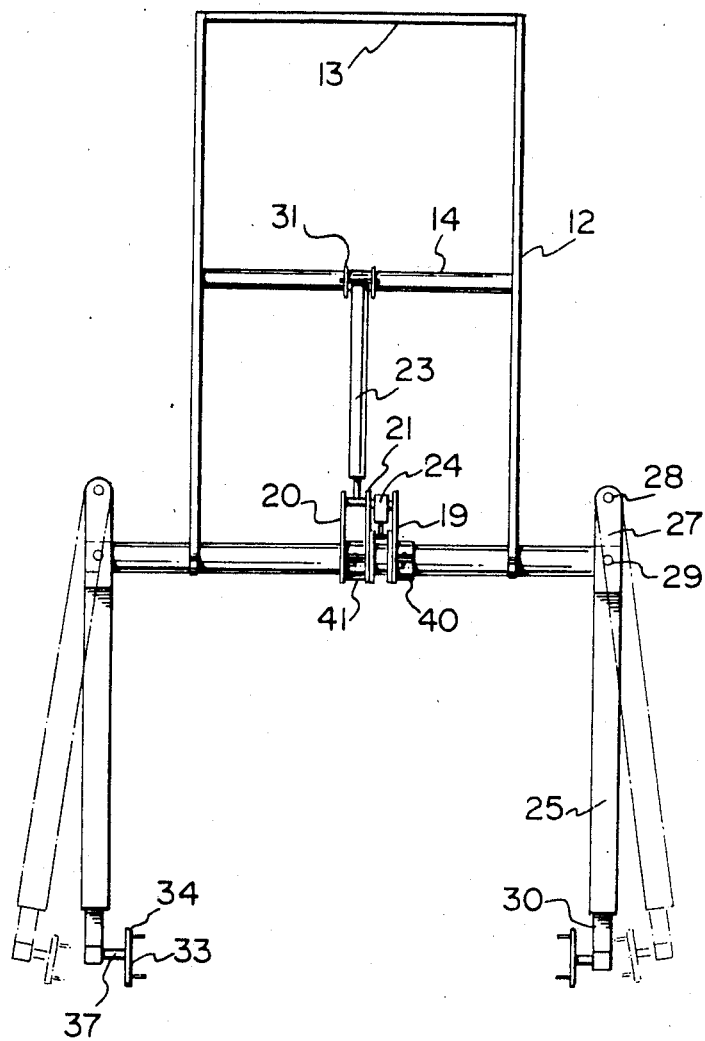
FIG. 2 is a plan view of the apparatus of FIG. 1 in one position.

Extending rearwardly from pivot shaft 16 are a pair of bale lifting arms 25. Each of these arms includes a support arm 26 extending substantially perpendicular to the axis of arm 25 and fixed to the upper end of each support arm 26 are a pair of vertically spaced mounting brackets 27 and 36, these being in a plane substantially parallel to the longitudinal axis of arm 25. These brackets 27 and 36 are mounted on brackets 18 at the ends of shaft 16. Pivot pins pass through holes 28 and through the holes in the ends of brackets 18 so as to provide a mounting with a lateral pivoting on shaft 16. The second series of holes 29 are to receive pivot pins which connect to the ends of rods 32. These rods 32 are connected to conventional hydraulic cylinders mounted within shaft 16, the details of which are not further illustrated. These hydraulic cylinders within shaft 16 move rods 32 inwardly and outwardly thereby swinging arms 25 laterally inwardly and outwardly in the manner shown in FIG. 2.

The arms 25 are preferably telescopic with an outer tubular portion 25 and an inner telescoping tubular portion 30. The telescoping action is provided by conventional hydraulic cylinders mounted on or within arms 25, further details of which are not illustrated. The outer ends of telescopic portions 30 support bale holders 33 having bale piercing pins 34. These bale holders 33 are pivotally mounted for free rotation by axles 37.

METHOD OF OPERATION

The operation of the device can best be seen from FIG. 1. In this view the rotation linkages in solid lines are shown for position I. This is the lowermost operational position when the device is being used to uncoil a bale of hay. As will be seen, the uncoiling is almost completed in this position. The hydraulic cylinder 23 is fully retracted and the hydraulic cylinder 24 is fully extended.

By applying the hydraulic oil in the direction to extend the cylinder 23, it pushs on pivot arms 19, 20 and 21 which in turn pull on fixed crank arms 22 and 22a via hydraulic cylinder 24. This causes rotation of shaft 16 and lifting of the bale lifting arms to position II. This represents the normal position for picking up a full bale.

Figure 5:
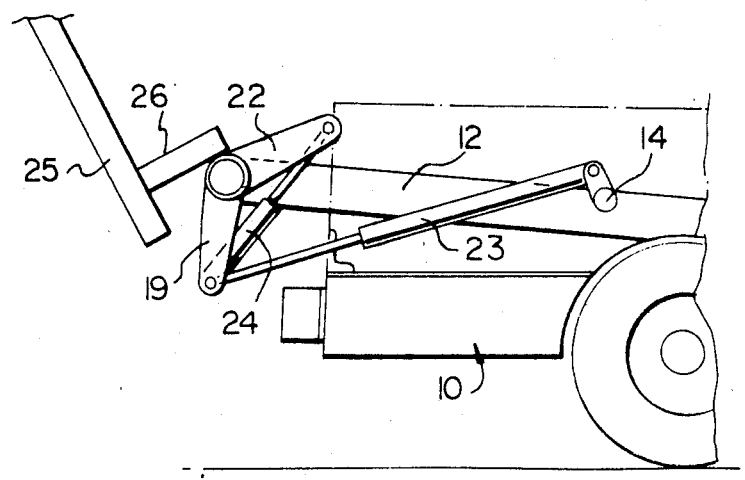
FIG. 5 is a detailed view of the apparatus in position III.

Further extension of hydraulic cylinder 23 causes further rotation of shaft 16, bringing arms 25 to position III. The locations of the hydraulic cylinders for this position are shown in FIG. 5 and it can be seen that cylinder 24 remains fully extended, while cylinder 23 has not yet reached its full extension. This represents a most convenient feature because by activating the telescopic arrangement in this position, the bale can be lifted high off the ground for dropping over the fence of a feeder area or into a round bale feeder.

Figure 6:
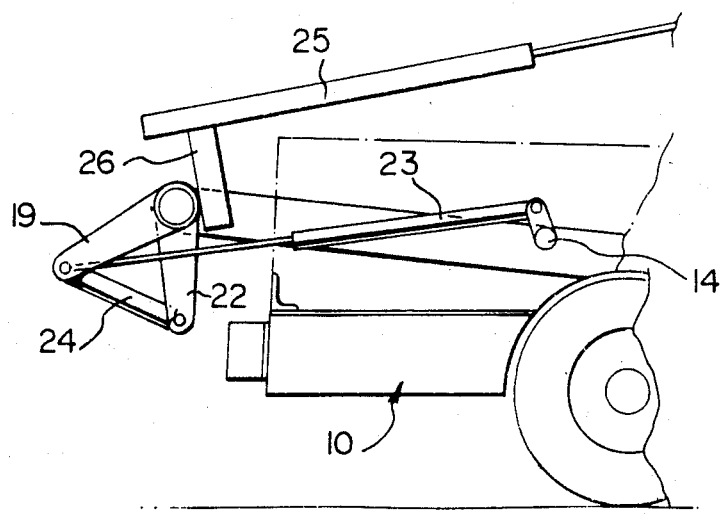
FIG. 6 is a detailed view of the apparatus in position V.

When bales are being loaded onto the truck, the bale is picked up as shown in position II and hydraulic cylinder 23 is fully extended causing rotation of shaft 16 and swinging the arms 25 around to approximately position IV. In this position, both cylinder 24 and cylinder 23 are fully extended. Thus, cylinder 23 has moved arms 19, 20 and 21 to the position of arm 19 in FIG. 6 and no more forward swinging action is possible by the movement of cylinder 23. However, by causing cylinder 24 to retract, fixed crank arms 22 and 22a are pulled toward the arms 19, 20 and 21, thereby swinging the bale lifting arms 25 to position V. By utilizing the telescopic mechanism with the position V, a bale can be positioned at the front of the truck box as shown in FIG. 1. With the bale in position V, a second bale can be loaded and held in position IV, resting against the bale in position V.

It will, of course, be understood that for unloading, the reverse sequence will be used. Thus, commencing with a bale in position V, the arms are moved forward to that position and the bale is engaged. Then, hydraulic cylinder 24 is first extended causing crank arms 22 and 22a to move away from arms 19, 20, 21 and thereby swing the bale from position V to position IV. At this point, the hydraulic cylinder 23 is retracted causing the shaft 16 and arms 25 to swing to position III or position II.

The hydraulic cylinders are actuated by means of a conventional hydraulic system, including a hydraulic pump, flexible flow tubes connecting to the cylinders and flow control valves. The actuating handles for the valves are conveniently placed on the upper left side of the front end frame assembly 13 where they can be reached by the operator in the truck cab.

Figure 7:
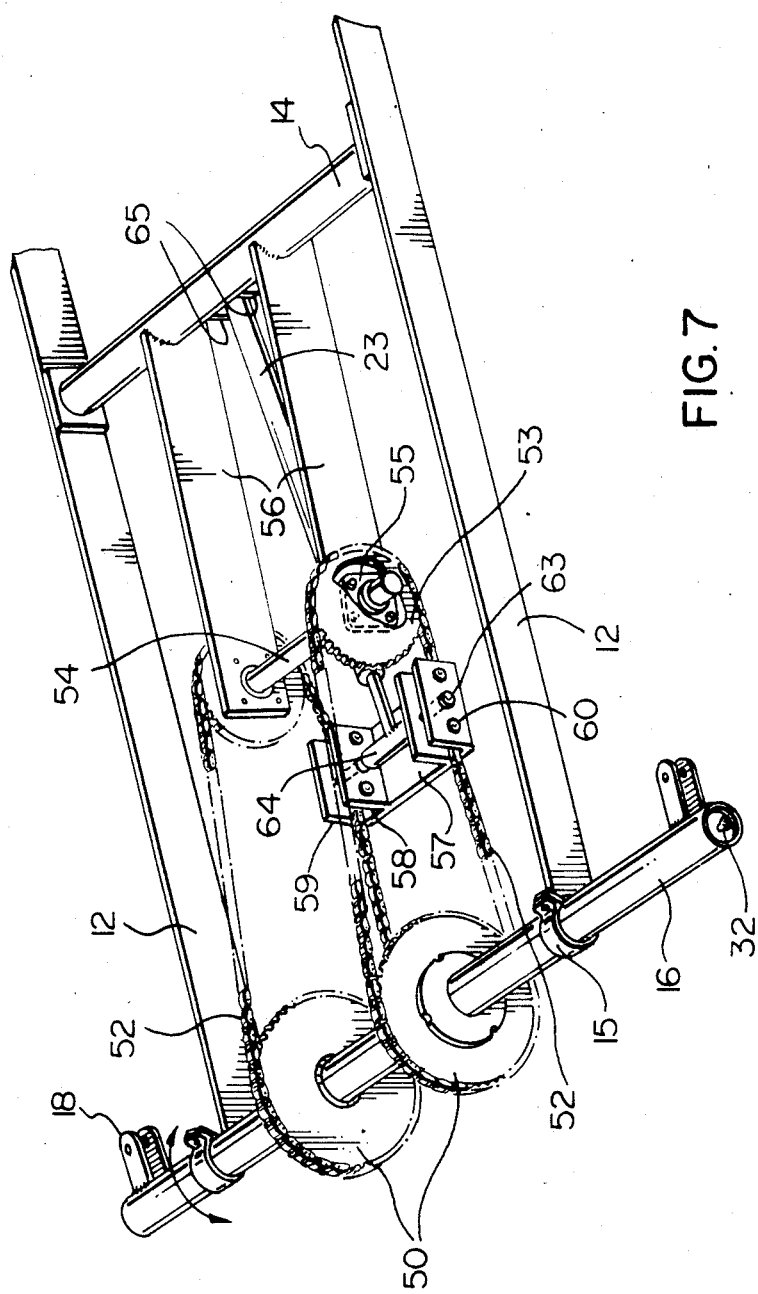
FIG. 7 is an alternative embodiment of the swing mechanism.

An alternative embodiment of the swing mechanism of is illustrated in FIG. 7.

This arrangements fits into the main frame structure between central cross bar 14 and main pivot shaft 16 and simply replaces the combination of hydraulic cylinders 23 and 24 of FIG. 3.

A pair of sprockets 50 are fixed to main pivot shaft 16 such that rotation of the sprockets causes corresponding rotation of the shaft 16. These sprockets 50 are connected by way of chains 52 to a further pair of sprockets 53 mounted on shaft 54. This shaft 54 is supported by bearings 55 fixed to support arms 56 which extend from cross bar 14.

A cross plate member 57 is attached across between the pair of chains 52. Extending upwardly from each end of cross plate 57 is an inner bracket 58 and an outer bracket 59 with a gap therebetween. The free ends of each chain extends into a corresponding gap between brackets 58 and 59, being held in position by pivot pins 60. Each pin 60 extends through a bracket 59 and a bracket 58.

A sleeve member 64 is attached to the end of hydraulic cylinder 23 and this sleeve member 64 is pivotally connected to the brackets 58, 59 by means of a long pin 63 extending through both sets of end brackets and through the sleeve 64. The opposite end of cylinder 23 is connected to bar 14 by means of brackets 65.

In operation, the hydraulic cylinder 23 simply extends or retracts, pulling the chains 52 in a forward or rearward direction thereby causing the desired rotation of sprockets 50 and pivot shaft 16. With this arrangement the pivot shaft 16 can be rotated through an arc of as much as 200° in the same manner as shown in FIG. 1.

According to another embodiment, the chains 52 may be replaced by cables, and the sprockets 50 and 53 may be replaced by suitable gripping pulleys.

Various modifications to the described embodiment, within the scope of the invention, will be apparent to one skilled in the art, the scope of the invention being defined by the appended claims.

I claim:

1. A carrier for cylindrical hay bales comprising:
   (a) a generally horizontal frame,
   (b) a shaft pivoted in said frame about a horizontal axis;
   (c) a pair of telescopic bale lifting arms mounted at first ends thereof to opposite ends of said pivoted shaft, said arms being mounted to said shaft by pivot pins perpendicular to the axis of said shaft to permit lateral swinging of the arms about said pivot pins,
   (d) bale piercing axle means at the outer ends of said arms for engaging and rotatably holding a cylindrical hay bale therebetween,
   (e) hydraulic means for moving said arms toward and away from each other about said pivot pins,
   (f) a primary hydraulic cylinder mounted at one end between a pair of crank arms fixed to said pivot shaft and mounted at the other end between a second pair of arms rotatably mounted on said pivoted shaft for either fixing or rotating said fixed and rotatable arms with respect to each other, and
   (g) a secondary hydraulic cylinder mounted at one end to the frame and mounted at the other end between a third pair of arms extending from a sleeve rotatably mounted on the pivoted shaft, one of said second pair of arms being also one of said third pair of arms and the other of said second pair of arms being an arm extending from a separate sleeve rotatably mounted on the pivoted shaft, with said rotatable sleeves being on each side of said crank arms fixed to the shaft, and the primary and secondary hydraulic cylinders being pivotally connected to the second and third pairs of rotatable arms by means of a single pivot pin,
   whereby with said primary hydraulic cylinder in fixed position thereby fixing the rotatable arms relative to the fixed crank arm, actuation of said secondary hydraulic cylinder causes movement of said bale lifting arms within an arc between a rearward position below the horizontal and a forward position beyond the vertical but short of attaining a forward horizontal position and whereby actuation of the primary hydraulic cylinder causes further movement of the bale lifting arms within a forward and downward arc toward a forward horizontal position.

2. A carrier according to claim 1 wherein the secondary hydraulic cylinder is adapted to swing the bale lifting arms through an arc of up to about 130°.

3. A carrier according to claim 2 wherein the primary hydraulic cylinder is adapted to swing the bale lifting arms through an additional arc of up to about 70°.

4. A carrier according to claim 1 wherein the hydraulic means are hydraulic cylinders.

5. A carrier according to claim 1 mounted in the box of a pickup truck, with the pivoted shaft extending behind and transversely to the truck body.

* * * * *